United States Patent

Friedman

[15] 3,659,101
[45] Apr. 25, 1972

[54] NANOSECOND PULSE HEIGHT ANALYZER

[72] Inventor: Jerome D. Friedman, Chelmsford, Mass.
[73] Assignee: The United States of America as represented by the Secretary of the Air Force
[22] Filed: Sept. 10, 1970
[21] Appl. No.: 70,966

[52] U.S. Cl. .................................................. 250/71.5 R
[51] Int. Cl. ............................................................ G01t 1/20
[58] Field of Search ........................ 250/71 R, 71.5 R, 71.5 S

[56] References Cited

UNITED STATES PATENTS 3,549,887  12/1970  Hansen ............................. 250/71 R Primary Examiner—James W. Lawrence
Assistant Examiner—Davis L. Willis
Attorney—Harry A. Herbert, Jr. and George Fine

[57] ABSTRACT

A nanosecond pulse height analyzer utilizing a cathode ray tube in conjunction with an array of photo sensitive elements wherein a cathode ray tube beam is deflected to a height proportional to the energy of, for example, a γ-ray photon which has been detected to provide the deflecting signal. At the peak height the grid of the cathode ray tube is gated. A photo sensitive device at this position registers this event into the associative memory, each photo sensor corresponding to a different energy. At the end of a counting period each memory can be read at leisure.

3 Claims, 1 Drawing Figure

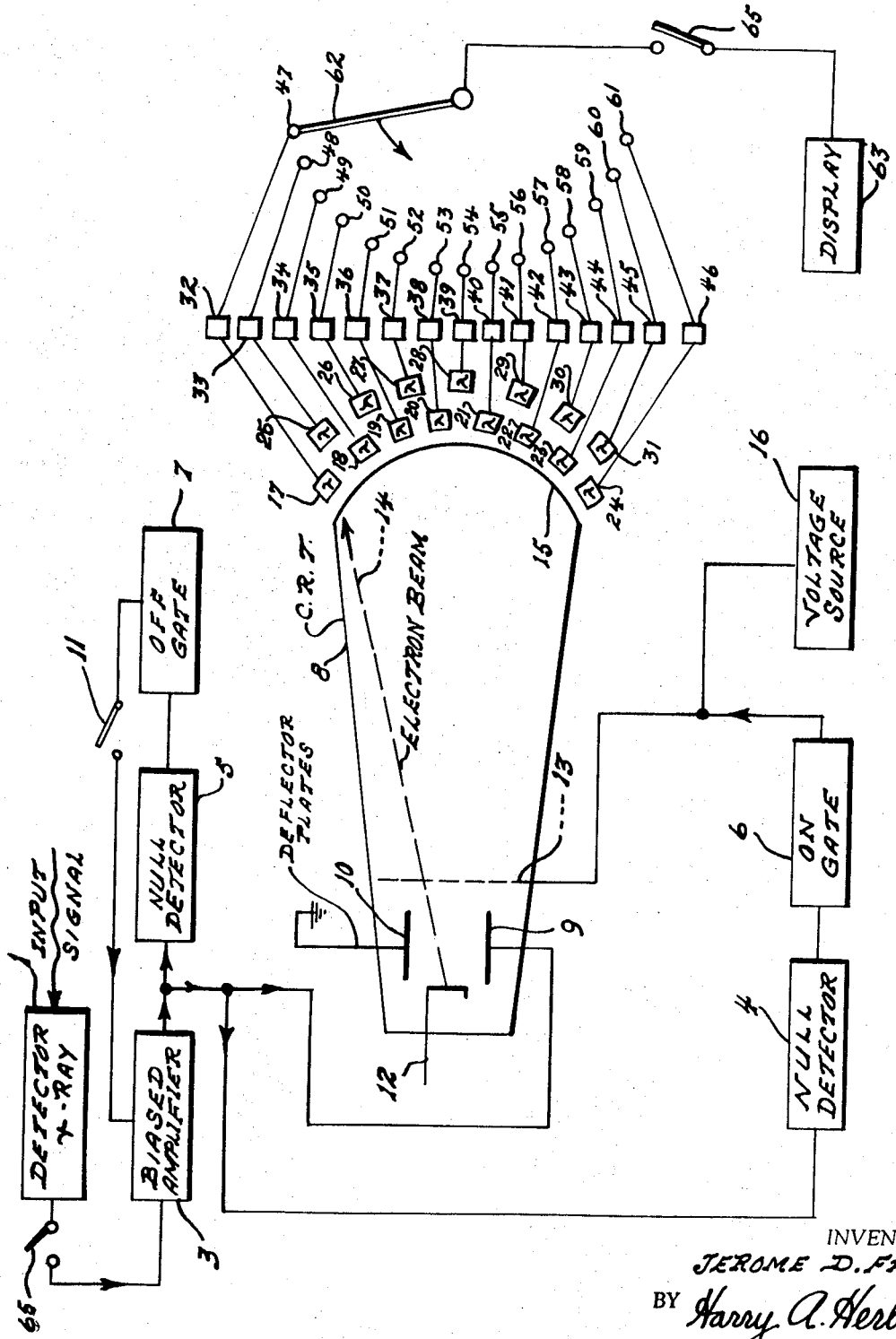

NANOSECOND PULSE HEIGHT ANALYZER

BACKGROUND OF THE INVENTION

This invention relates to a pulse height analyzer and more particularly a pulse height analyzer utilizing a cathode ray tube in conjunction with an array of sensitive elements such that the time per channel of the pulse height analyzer is in the sub-nanosecond range.

The prior art pulse height analyzers are in the 1 – 10 $\mu s$ per channel range and for some vital measurements will not provide the desired results. For example, the Air Force Cambridge Research Laboratory (AFCRL) Linear Accelerator (LINAC), like most LINACS, puts out a 4-½ $\mu s$ pulse of electrons at about 400 ma. The usual reaction is a $\gamma$-ray into the nucleus of the target material and a neutron or proton out. The resultant isotope atoms will be $\phi t =$ number of product nuclei formed
$N =$ number of target nuclei $\theta =$ cross-section of target nuclei $f =$ number of electrons
$\lambda =$ decay constant for many isotops $\lambda^{-1} = 1/\lambda$ is in the nanosecond range. This means that there can be literally many billions of $\gamma$-rays given off by the Linear Accelerator produced isotope during the LINAC Pulse. However, a typical height analyzer is in the 1–10 $\lambda s$ per channel range. Thus for a typical $\gamma$-ray spectrum (using the AFCRL Nuclear Data Channel Pulse Height Analyzer), a $\gamma$-ray spectrum photopeak following in the 100th channel would take: 100 channels × 10 × 10$^{-6}$ sec/channel = 1 ms. The typical pulse height analyzer gates itself off from further input information during this time interval. This means that as presently used, the LINAC and Nuclear Data Pulse Height Analyzer can only count one $\gamma$-ray photon per 4-½ $\mu s$ LINAC pulse. With the nanosecond pulse height analyzer of the present invention, several hundred photons per pulse may be counted, possibly even several thousand. Thus the utilization of the present invention may make possible the discovery of nuclear interactions of very short half lives and very small cross-sections. It is also noted that the present invention may allow direct observation of the spectrum from a nuclear weapon blast and also permit activation analysis directly in front of a Linear Accelerator during the LINAC pulse.

SUMMARY OF THE INVENTION

A nanosecond height pulse analyzer in which a $\gamma$-ray photon strikes a detector which fluoresces; a photomultiplier tube then emits a voltage pulse proportional to the fluorescense which is proportional to the $\gamma$-ray photon. This output pulse is then applied to the deflection plates of a cathode ray tube (CRT). The CRT electron beam then travels up the fluorescent screen of the CRT. However, because of a null detector and gate associated with the grid of the CRT, the CRT electron beam will strike the CRT face only at the peak voltage of the signal pulse. A photo sensitive device at this position which corresponds to a given channel and thus energy then emits a voltage signal into its associative memory; each channel having its own memory. The memory stores a charge proportional to the number of light or electron pulses that the photo device had seen during the counting period. At the termination of the counting period, the memory (charge) is "dumped" into a display or readout device such as $x$–$y$ plotters or oscilloscopes.

An object of the invention is to provide a pulse height analyzer operating in the nanosecond range.

Another object of this invention is to provide a pulse height analyzer wherein a cathode ray tube is used in conjunction with an array of photo sensitive elements such that the time per channel of the pulse height analyzer is in the range of sub-nanoseconds.

DESCRIPTION OF THE DRAWING

The single FIGURE of the nanosecond pulse height analyzer of this invention is partly in schematic and partly in block diagram form.

DETAILED DESCRIPTION OF THE PREFERRED EMBODIMENT

Now referring to the single figure of the invention, there is shown $\gamma$-ray detector 1 which may be comprised of a combination of a conventional sodium iodide crystal detector and a conventional multiplier. The sodium iodide crystal detector fluoresces in response to an input $\gamma$-ray photon and in response thereto the photomultiplier tube then emits a voltage pulse proportional to the fluorescence which is proportional to the $\gamma$-ray photon. Thus there is provided an output signal from detector 1 that is a voltage signal pulse proportional to the energy of the $\gamma$-ray photon. It is noted that the sodium iodide crystal detector may have substituted therefor a lithium drifted silicon detector or P I N diode, etc. The $\gamma$-ray photon detector as heretofore mentioned is conventional, but there are many state of the art devices which may also be utilized.

The output pulse from $\gamma$-ray detector 1 is received by normally conducting amplifier 3; this amplifier is then gated off from further pulses from $\gamma$-ray detector 1 by the combined action of null detector 5 and off gate 7 for the duration of the cycle, i.e., when electron beam 14 returns to sensor 17, the rest position. The electron beam 14 returns to sensor 17, the rest position, due to the bias of amplifier 3 acting on deflector plate 9. Biased amplifier 3 is gated off for the duration of the output signal from off gate 7 because said output signal's duration is proportional to the voltage of the initial pulse from $\gamma$-ray detector 1. Alternately, off gate 7 may be adjusted to emit a pulse of fixed duration regardless of the voltage signal from $\gamma$-ray detector 1. It is noted gating off amplifier 3 is optional. The output pulse from the biased amplifier is simultaneously received by null detectors 4 and 5 and deflection plate plate 9 of conventional cathode ray tube 8.

Null detectors 4 and 5 may also be the type of differentiators such as shown and described in, "Applications for Modeling, Measuring, Manipulating and Much Else," pages 48–49, published June, 1966 by Philbrick Research, Inc., or as in, "Electronic and Radio Engineering," Chapter 18, by Terman, published in 1955 by McGraw-Hill. It is also possible to utilize peak detectors in place of null detectors. Cathode ray tube 8 is comprised of deflection plates 9 and 10, cathode 12, control grid 13, and face 15. It is noted that the actuating voltage sources for cathode ray tube 8 have been omitted except for voltage source 16 but they are conventional. Voltage source 16 provides a negative bias to control grid 13 so that normally electron beam 14 does not strike face 15. Sensors 17–31 are positioned flush on the outside surface of face 15. Channel sensors 17–31 may be either photo or electron sensors and each one is at a preselected position so as to be representative of a predetermined magnitude of sweep of electron beam 14. Capacitors 32–46 are connected to sensors 17–31 respectively. Switch contacts 47–61 are connected to capacitors 32–46, respectively. Movable switching arm contact 62 is arranged so that it makes contact with switch contacts 47–61 in sequence and provides an output to display 63. Display 63 is conventional and may be an oscilloscope, or $x$–$y$ plotter, etc.

Upon receipt by null detector 5, deflection plate 9 and null detector 4 of the output pulse from biased amplifier 3, three events occur simultaneously. In the first event, null detector 5 provides an output pulse initiated at and representative of the peak height of the input pulse thereto. Off gate 7 in response to the output pulse from null detector 5 provides a pulse whose duration is either proportional to the peak height of the impulse height thereto or is of fixed duration which gates off biased amplifier 3 for the duration of the cycle or for a preselected time as desired. Switch 11 is normally closed; to integrate, the switch is opened. On gate 6, in response to the output pulse from null detector 4 provides a pulse of preselected duration and polarity to control grid 13. The cathode ray tube grid is ordinarily negatively biased thus preventing the sweeping electron beam from striking the sensors. The combination of null detector 4 and on gate 6 change grid bias positively for a preset time allowing the sweeping electron beam to strike only one of the sensors corresponding to the peak voltage of the input signal ($\gamma$-ray photon). The electron beam then returns to the rest position, channel one (i.e., sensor 17).

When sufficient information for a spectrum has been accumulated in the memories (capacitors 32–46), memory switch 64 is closed, detector switch 65 opened, and the stored information is read out for each individual channel into display 63 such as an oscilloscope of an analog to digital converter and typewriter read out (all being commercially available).

In brief summary, one $\gamma$-ray photon strikes a sodium iodide crystal detector which fluoresces; a photomultiplier tube then emits a voltage pulse proportional to the fluorescence which is proportional to $\gamma$-ray photon. This output pulse is then applied to the deflection plates of a cathode ray tube (CRT). The CRT electron beam then travels up the fluorescent screen of the CRT. However, because of the combination of the null detector and gate associated with the control grid of the CRT, the CRT electron beam will strike the CRT face only at the peak voltage of the signal pulse. The photo sensitive device of this position which corresponds to a given channel and thus energy then emits a voltage signal into its associative memory; each channel has its own memory. This ends the cycle. At the beginning of the cycle the amplifier was gated off from further input information because of the feedback from null detector and off gate the amplifier is now ready for another cycle (this feature is optional depending on the type of analysis being done). The memories can be of several commercially available devices; the simplest is a capacitor and voltage source. The capacitor stores a charge proportional to the number of light or electron pulses that the photo device had seen during the counter period. At the termination of the counting period, the capacitor is "dumped" into any of many types of commercially available display or readout devices.

In one version of this invention it is possible to utilize Tektronix Type RM 567 oscilloscope for the CRT with the photo device array flush on the surface of the scope CRT. This scope will sweep at 0.2 NS/cm. Assuming 100 photodevices per cm and 200 channels, the speed would then be $$\frac{0.2 \text{ NS/cm.} \times 2 \text{ cm.}}{200 \text{ ch.}} \times 2 (\text{return sweep})$$

$$= 4 \times 10^{-3} \text{ nanoseconds/channel};$$

with the optional "off" gate this means that the pulse height analyzer would be off for only 0.4 NS to the 100th channel and back. The limitations to the speed would be a function of the detector speed, the speed at which information could be entered into memory circuits, and the sensor response time.

The very fastest method of operation would be to have an array of PIN diodes within the CRT rather than photo devices outside the tube. The CRT electron beam would strike the diodes directly (all else would remain as shown in the single FIGURE).

What is claimed is:

1. A nanosecond pulse height analyzer comprising a detector receiving an input photon signal and providing in response thereto a voltage pulse proportional to said input photon signal, means to amplify said voltage pulse, a cathode ray tube having a deflection plate, control grid, and face, said cathode ray tube normally being biased negatively to prevent an electron beam therein from striking said face, a multiplicity of sensors arranged on the surface of said face, each of said sensors being at a different preselected position, each of said positions being representative of a predetermined magnitude of sweep of said electron beam, said deflection plate receiving said amplified voltage pulse causing said electron beam to sweep a distance proportional to said input photon signal, a null detector providing an output pulse initiated at and representative of the peak height of the input signal thereto, an on gate providing an output pulse of preselected duration upon receiving an input signal, said null detector and said in gate being connected in sequence on a series combination, said series combination interconnecting said amplifying means and said control grid, said series combination receiving said amplified voltage pulse simultaneously with said deflecting plate and operating in response thereto to provide an output pulse of preselected duration to charge the control grid positively for a preset time, allowing said electron beam to strike one of said sensors corresponding to the peak voltage of said input photon signal, an associated memory for each of said sensors to store information for a preselected time to provide complete spectrum analysis, and means to read out in sequence the stored information in the memories at a predetermined time.

2. A nanosecond pulse height indicator as described in claim 1 wherein said means to amplify includes a first and second input means to gate off from a normally conductive state, said means to gate off including a second null detector, an off gate, said second null detector and said off gate being connected in sequence in a second series combination, said second series combination being interconnected between the output of said amplifying means and said second input of said amplifying means.

3. A nanosecond pulse height analyzer comprising a detector receiving an input photon signal and providing in response thereto a voltage pulse proportional to said input photon signal, means to amplify said voltage pulse, said means to amplify including a first and second input, said first input receiving said voltage pulse, means to gate off said amplifying means from a normally conductive state, said means to gate off including a first null detector, an off gate, said first null detector and said off gate being connected in sequence in a first series combination, said first series combination being interconnected between the output of said amplifying means and said second input of said amplifying means, a cathode ray tube having a deflection plate, control grid, and face, said cathode ray tube normally being biased negatively to prevent an electron beam therein from striking said face, a multiplicity of sensors arranged on the surface of said face, each of said sensors being at a different preselected position, each of said positions being representative of a predetermined magnitude of sweep of said electron beam, said deflection plate receiving said amplified voltage pulse causing said electron beam to sweep a distance proportional to said input photon signal, a second null detector providing an output pulse initiated at and representative of the peak height of the input signal thereto, and an on gate providing an output pulse of preselected duration upon receiving an input signal, said second null detector and said on gate being connected in sequence in a second series combination, said second series combination interconnecting the output of said amplifying means and said control grid, said second series combination receiving said amplified voltage pulse simultaneously with said deflecting plate and operating in response thereto to provide an output pulse of preselected duration to charge the control grid positively for a preset time, allowing said electron beam to strike one of said sensors corresponding to the peak voltage of said input photon signal.

* * * * *